(12) United States Patent
Sasazaki

(10) Patent No.: US 7,883,010 B2
(45) Date of Patent: Feb. 8, 2011

(54) SHEET-LIKE FORMED MATERIAL

(76) Inventor: Tatsuo Sasazaki, 17-8-702, Ryoke 1-chome, Urawa-ku, Saitama-shi, Saitama 3300072 (JP)

( * ) Notice: Subject to any disclaimer, the term of this patent is extended or adjusted under 35 U.S.C. 154(b) by 842 days.

(21) Appl. No.: 10/593,932

(22) PCT Filed: Mar. 25, 2005

(86) PCT No.: PCT/JP2005/005475
§ 371 (c)(1),
(2), (4) Date: Nov. 23, 2006

(87) PCT Pub. No.: WO2005/108212
PCT Pub. Date: Nov. 17, 2005

(65) Prior Publication Data
US 2007/0241900 A1 Oct. 18, 2007

(30) Foreign Application Priority Data
Mar. 25, 2004 (JP) .............................. 2004-124821
Apr. 28, 2004 (JP) .............................. 2004-133323

(51) Int. Cl.
*G06K 7/08* (2006.01)
*G06K 19/06* (2006.01)

(52) U.S. Cl. ...................... 235/380; 235/375; 235/451; 235/487; 235/492; 235/383; 235/385; 340/5.1; 340/572.1; 340/572.2

(58) Field of Classification Search ................. 235/375, 235/385, 492, 370, 380, 451, 487; 340/5.1, 340/572.1
See application file for complete search history.

(56) References Cited

U.S. PATENT DOCUMENTS

| 6,409,401 | B1 * | 6/2002 | Petteruti et al. ............... 400/88 |
| 6,478,229 | B1 | 11/2002 | Epstein |
| 6,667,092 | B1 | 12/2003 | Brollier |
| 6,899,476 | B1 * | 5/2005 | Barrus et al. .................. 400/76 |
| 6,943,678 | B2 | 9/2005 | Muirhead |
| 7,112,001 | B2 * | 9/2006 | Hohberger et al. .......... 400/611 |
| 7,368,032 | B2 * | 5/2008 | Green et al. ................. 156/264 |
| 2002/0195195 | A1 * | 12/2002 | Grabau et al. ............... 156/300 |
| 2003/0121986 | A1 * | 7/2003 | Stromberg et al. .......... 235/492 |
| 2003/0136503 | A1 * | 7/2003 | Green et al. ................. 156/264 |

(Continued)

OTHER PUBLICATIONS

PCT/AU00/00080 (WO 00/46122) published on Aug. 10, 2000 and entitled Layered Material Including Indicia and/or Security Means Between Layers, discloses a sandwiching manufacturing configuration to create a multi-layer structure.

(Continued)

*Primary Examiner*—Thien M. Le
*Assistant Examiner*—Tuyen K Vo
(74) *Attorney, Agent, or Firm*—Curtis L. Harrington; Kathy E. Harrington; Harrington & Harrington

(57) ABSTRACT

A sheet-like formed material having a tape with IC tags useful for a production line for a sheet-like formed material continuously produced at high speed. A sheet-like formed material (40) where a tape (30) on which IC tags (20) are arranged at appropriate intervals is superposed on a sheet-like formed raw material, wherein the tape (30) with the IC tags is fixedly adhered, between sheet layers constructed in a layered form, to a cut sheet (100) from end to end of the sheet.

10 Claims, 6 Drawing Sheets

U.S. PATENT DOCUMENTS

2003/0227528 A1* 12/2003 Hohberger et al. .......... 347/104
2004/0005754 A1* 1/2004 Stromberg .................. 438/222
2005/0021172 A1* 1/2005 Winter et al. ............... 700/228

OTHER PUBLICATIONS

PCT/FR98/02611 (WO 99/31626) published on Jun. 24, 1999 and entitled Substrate Provided With an Electronic Device, discloses a multi step process for creating a corrugated structure.
18. German Patent DE 101 40 286 A1 published Mar. 3, 2003 and entitled "Die Folgenden Angaben Sind Den Vom Anmelder Ingereichten Unterlagen Entnommen", further deales with a corrugated structure.
Japan Patent Reference JP 2002-319006 of Oct. 31, 2002 and entitled "Anti-Counterfeit Thread, Anti-Counterfeit Sheet-Shaped Material Using it, and Method of Manufacturing It".
Japan Patent Reference JP 2003-011914 of Jan. 15, 2003 and entitled "Method for Mounting ic Tag and Carrier Tape for Feeding IC Tag".
Japan Patent Reference JP 2003-081344 of Mar. 19, 2003 and entitled "Auxiliary Packaging Material on Which IC is Fitted".
Japan Patent Reference JP 2003-216984 of Jul. 31, 2003 and entitled "Ticked Issuing Terminal Equipment for Rolled Paper, and Control System".
Japan Patent Reference JP 2003-233311 of Aug. 22, 2003 and entitled "Continuous Body of Label and Method of Manufacturing the Same".
Japan Patent Reference JP 2003-281630 of Oct. 3, 2003 and entitled "Receipt and Register for Issuing It".
Japan Patent Reference JP 2005-084954 of Mar. 31, 2005 and entitled "Electronic Tag-Mounted Combinational Device and Electronic Tag".
Japan Patent Reference JP 2006-306977 of Nov. 9, 2006 and entitled "Manufacturing Method of Corrugated Cardboard With IC Inlet".
Japan Patent Reference JP 2005-084954 of Mar. 31, 2005 and entitled (translation) Electronic Tag-Mounted Combinational Device and Electronic Tag.
Australian Search report with Document 1 relating to US 6,667,092, Document 2 relating to JP2003-233311 and Document 3 relating to JP2000-20669.
JP2003-233311 entitled Continuous Body of Label and Method of Manufacturing the Same (with translation attached).
JP2000-20669 entitled Production of IC Card and the IC Card, along with (translation attached).
European Patent EP 1284 320 A2 entitled "Verfahren zur Herstellung von mit Transpondern versehener Wellpappe un mit transpondern versehene Wellpappe" of Feb. 19, 2003 (in German).
JP2003-319006 entitled Anticounterfeit Thread, Anti-Counterfeit Sheet-Shaped Material Using it, and Method of Manufacturing It (kouhouhakkou = Oct. 31, 2002).
JP2005-084954 entitled Electronic Tag-Mounted Combinational Device and Electronic Tag (kouhouhakkou = Mar. 31, 2005).

* cited by examiner (a)

(b)

SHEET-LIKE FORMED MATERIAL

CROSS REFERENCE TO RELATED APPLICATIONS

This is a national phase of International Patent Application No. PCT/JP2005/005475, with an international filing date of Mar. 25, 2005. This application based upon and claims the benefit of priority from the prior Japanese Patent Applications No. 2004-124821, filed Mar. 25, 2004, and No. 2004-133323, filed Apr. 28, 2004 the entire contents of which are incorporated herein by reference.

BACKGROUND OF THE INVENTION

1. Technical Field

The present invention relates to sheet material with IC tags.

2. Description of the Related Art

An example of a corrugated structure with IC tag labels adhesively attached is disclosed in U.S. Pat. No. 6,667,092. This conventional corrugated structure includes a second linerboard and a single-face flute that is comprised of a first linerboard and a corrugated medium. The IC tag labels are attached to one side of the second linerboard. Then the second linerboard is adhesively bound with the corrugated medium so that the IC tag labels are sandwiched between the second linerboard and the corrugated medium. In producing the corrugated structure with IC tags, the IC tags are handled in the form of IC tag labels. The IC tag labels are formed from a label sheet that includes a release liner, a label substrate, an adhesive layer that is disposed on the bottom surface of the label substrate, and IC tags that is positioned on the upper surface of the label substrate. After the IC tags are attached to the adhesive layer, by making cutting line on label substrate and the adhesive layer so that cutting line surrounds IC tags, IC tag labels can be removed from the release liner. The IC tag labels are attached to the corrugated structure according to the following steps. First, the label sheet is unwound from a reel. The unwound label sheet is moved downstream between two rolls that are compressing the label sheet. At the same time, each IC tag label is exfoliated from the release liner and attached to the predetermined positions on one side of the second linerboard facing the corrugated board. The label sheet, after the IC tags are removed from it, is wound into a roll. The positions to attach IC tags are determined based on the marks on the second linerboard read by a sensor.

The corrugator is a machine that has a large width (approximately two meters) and that is operated at high speed (200-300 meters per minute). One sheet of the sheet material is slit into several pieces in the cross direction. The same number of labelers as the number of the pieces is needed and the labelers need their own space. For making the space, the bulk corrugator, having a length of 100 meters or more, must undergo a large modification. The corrugator should preferably be operated at a constant laminating speed to keep the adhesive strength of corrugated board sheet and flatness of cut sheets. However, when the intermittent labeler disclosed in U.S. Pat. No. 6,667,092 is used without reducing the traveling speed of the second linerboard, mechanical troubles are likely to occur. Consequently, the IC tag may be attached to the sheet material improperly or the IC tag may be damaged. This means that IC tag loss occurs frequently. As the IC tag is expensive (several tens yen/IC tag), such IC tag loss increases the production cost of corrugated board boxes with IC tags. Spending the high production cost is not acceptable because corrugated board products are characterized in its cheep cost.

SUMMARY OF INVENTION

Considering the above-mentioned problems, one objective of the present invention is to provide sheet material including IC-tag tape coupled between its layers along their entire length.

Said objective and other objectives as well as new features of the present invention will be more fully understood with reference to the following description and the accompanying drawings.

In one embodiment of the present invention, an IC tag tape is attached to a sheet material. The IC tags (20) are attached to the IC-tag tape (30) with a constant pitch. The IC-tag tape is coupled between the laminated layers of the sheet material along their entire length.

The term "IC tag" as used herein refers to an IC tag that includes an IC chip and an on-chip antenna. The on-chip antenna is enclosed inside the IC chip. The on-chip antenna is configured to receive a radio wave from an external radio antenna. The on-chip antenna then sends out the data to a processing unit. The term "IC tag" also refers to an IC tag with an inlet (i.e. a substrate film). In this embodiment, the IC tag as described above is attached to an inlet. The term "IC tag" further refers to an IC tag with an external antenna attached from outside the tag. The term "IC tag" further refers to an IC tag formed by attaching the above-mentioned types of IC tag to a cover material such as laminate film. In the example above, the IC tag can be replaced with a printed organic transistor. The term "IC tag" further refers to an IC tag formed by covering printed organic transistors with the cover material. The organic transistors are configured to function as a processor. The term "IC-tag tape" as used herein refers to a structure including an IC chip and a successively formed tape substrate. The IC chip is attached to or formed on the tape substrate. The IC chip includes at least a radio processor having a logic/storage circuit and a radio antenna. The radio processor is configured to send out information to a processor without making contact with the processor.

The tape substrate is ranged from 2 to 100 mm in width and preferably from 4 to 10 mm in width. The pitch of IC tags on the tape substrate may be a constant distance of 5-300 cm.

The IC-tag tape, as it is, can be used as a cut tape, a sealing material, a binding material, or a display material, or some other materials used for other purposes. The material of the tape substrate or other features of the IC-tag tape can be selected according to its use.

Any configuration of a sheet material can be used in the present invention as long as it is comprised of laminated sheets and an IC-tag tape that is attached between the laminated layers along their entire length. The sheet material may be, for example, a corrugated board with the IC-tag tape, paper with the IC-tag tape, a synthetic resin sheet with the IC-tag tape, a synthetic resin film with the IC-tag tape, and other sheet material with the IC-tag tape. In the example of a corrugated board with the IC-tag tape, the IC-tag tape may be deployed between a single-face flute and a second linerboard or a first linerboard. The IC-tag tape may be inserted to any MD position (position in machine direction) in the corrugated board. In the example of paper including two or more layers, the IC-tag tape may be deployed between the layers. The IC-tag tape may be inserted to any position in the cross direction of the paper. The sheet material in this invention further includes packaging products made of the sheet material in addition to the above-mentioned sheet material.

As described above, the present invention has the following advantages.

According to the invention of claim 1, in a case the sheet material having the IC-tag tape between its laminated layers along their entire length is a corrugated board, IC-tag tape is inserted between a single-face flute and a linerboard. Accordingly, the IC tag tape is held between the single-face flute and the linerboard and firmly fixed in a predetermined CD position (position in cross direction).

Therefore, it is possible to prevent the IC-tag tape from dropping off the corrugated board during a process to form the corrugated board. It is also possible to prevent the IC tags from dropping off the corrugated board when it receives a vibration or a drop impact during the shipment. As the IC tags are positioned inside the second linerboard, it is also possible to prevent the IC tags from being damaged even if the corrugated board becomes worn because of the friction between the boxes during the shipment.

BRIEF DESCRIPTION OF THE DRAWINGS

Hereinafter, the configurations of the IC-tag tape, the production method for a corrugated board with an IC-tag tape attached thereto, and the inspection method for a corrugated board with the IC-tag tape will be described as one embodiment of the present invention.

DETAILED DESCRIPTION OF THE INVENTION

Figure 1:
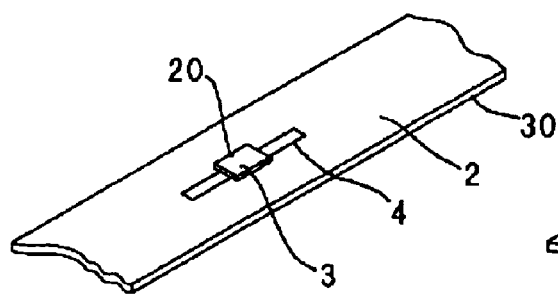
FIG. 1a is a perspective view of the IC-tag tape according to one embodiment of the present invention.
FIG. 1b is a perspective view of the IC-tag tape according to one embodiment of the present invention.
Figure 1:
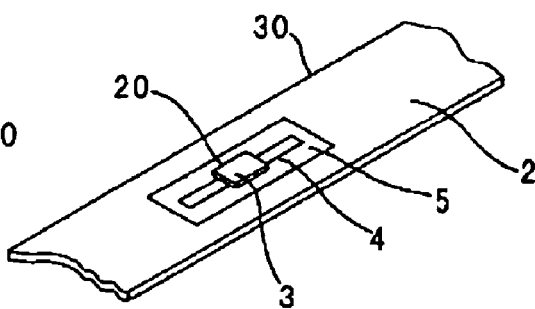

FIG. 1a and FIG. 1b show two typical configurations of an IC-tag tape (30). The term "IC (Integrated Circuit)" as used herein refers to an IC such as a silicon semiconductor as well as to an organic transistor formed by printing an electronic circuit or the like on a plastic film.

FIG. 1a shows an IC-tag tape (30) that includes a successively formed tape substrate (2) and IC tags (20). The IC tags (20) are attached to the tape substrate (2) with a constant interval. The tape substrate is ranged from 2 to 100 mm in width. This width of tape is suitable for attaching IC tags (20) to a corrugated board. The IC tags (20) may be comprised of an IC (3) (i.e. a chip covered with a protecting material) and an external antenna (4). The external antenna (4) is placed outside the IC (3) whereas an on-chip antenna is enclosed in the IC.

In the IC-tag tape (30) of FIG. 1b, an IC tag (20) includes an IC (3), an antenna (4), and a substrate film (inlet) (5). The substrate film (5) is positioned between the antenna and the tape substrate (2). The IC (3) is placed on the antenna (4). In this embodiment, the tape substrate (2) of the IC-tag tape (30) can be made of any material.

Figure 2:
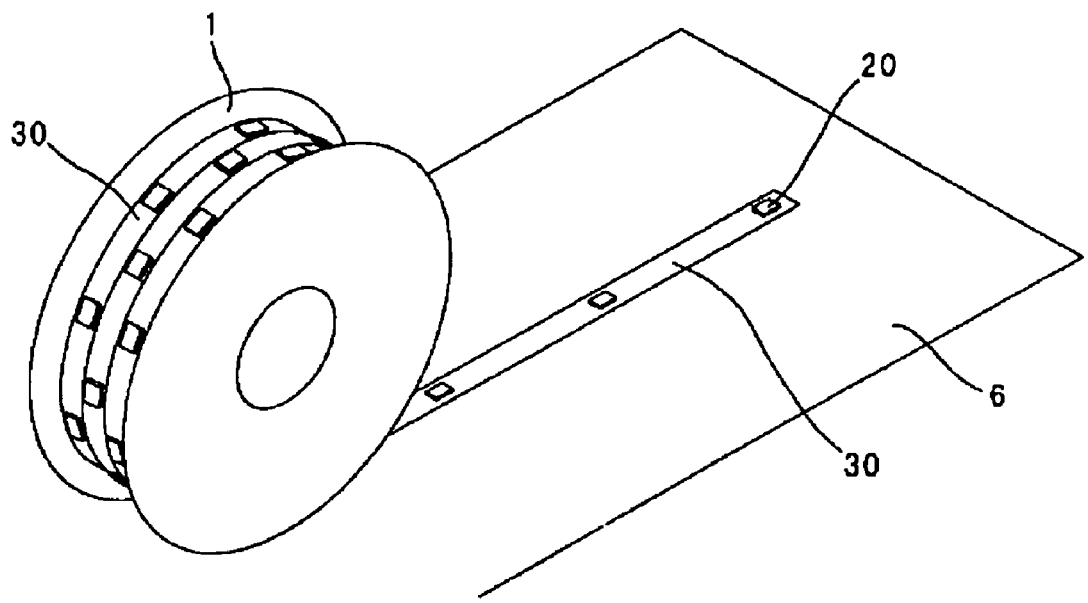
FIG. 2 is a perspective view of the IC-tag tape according to another embodiment of the present invention.

FIG. 2 shows another embodiment of the IC-tag tape (30) where a cover material (6) (e.g. laminate film) is adhesively attached to the IC tags (20) so that the cover material can cover the IC tags (20) shown in FIG. 1a or FIG. 1b.

In the two embodiments of IC-tag tape (30) as shown in FIG. 1a and FIG. 1b, the IC tags (20) are not covered with a cover material (6), so that they are exposed on the surface of the tape substrate (2).

The tape substrate (2) is made of, for example, a paper material, but may be made of any other material. A tape substrate (2) of paper material is easier to process than a tape substrate (2) of the other materials. For example, an antenna can be easily attached to the tape substrate (2) of paper material. As a result, the tape substrate (2) made of paper material is more cost effective than that of the other materials. Such paper material includes, for example, brown thin wrapping paper, which is 0.05 to 0.2 mm thick, kraft paper, and the like. In addition, regular paper with improved waterproofing can be used as such paper material. Such regular paper does not allow for liquid glue (alkaline glue) to soak into it.

The tape substrate (2) can be a plastic film. When organic transistors are printed on a plastic film, the plastic film can be used as an IC-tag tape (30). The plastic film with organic transistors is easy to be wound onto a paper core having a predetermined width. Thus, when the IC-tag tape (30) is the plastic film with organic transistors instead of IC chips, IC-tag tape reel (1) can easily be made (See FIG. 2).

Figure 3:
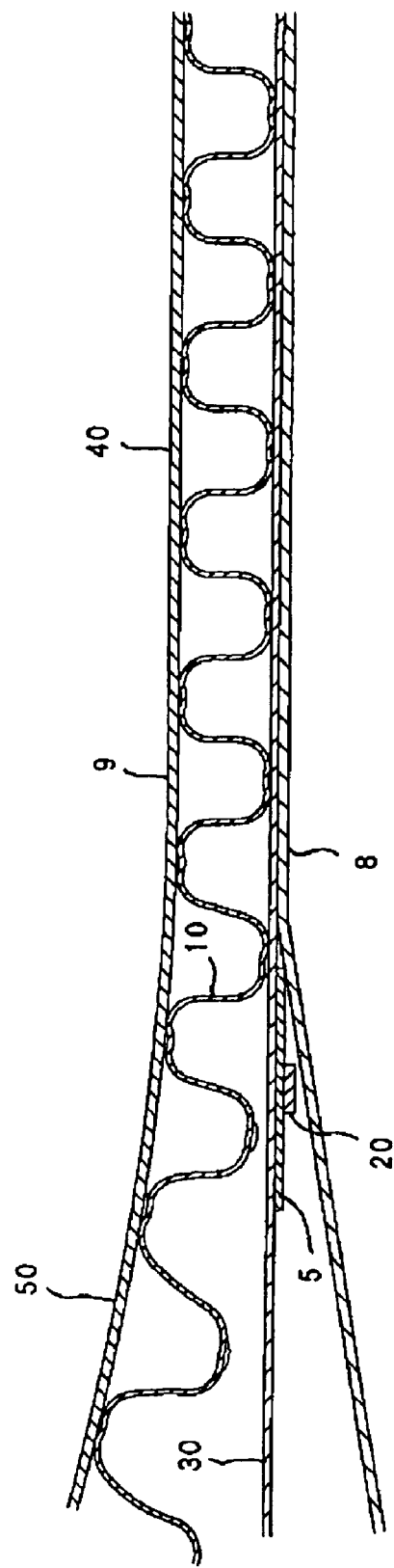
FIG. 3 is a cross section of the sheet material according to one embodiment of the present invention. The figure shows the schematic structure of one type of IC tag attached to the tape substrate.

FIG. 3 shows a corrugated board as one embodiment of the sheet material with IC-tag tape according to the present invention.

FIG. 3 shows a corrugated board (40) that includes a second linerboard (8), a corrugated medium (10), a first linerboard (9), and an IC-tag tape (30). The IC-tag tape (30) is coupled between the corrugated medium (10) and the second linerboard (8). The IC tags (20) on the IC tag tape (30) face the second linerboard (8). The IC-tag tape (30) as shown in FIG. 1a or FIG. 1b can be used in this embodiment. The adhesive surrounding each IC tag (20) prevents it from moving on/dropping off the surface of the tape substrate.

Figure 4:
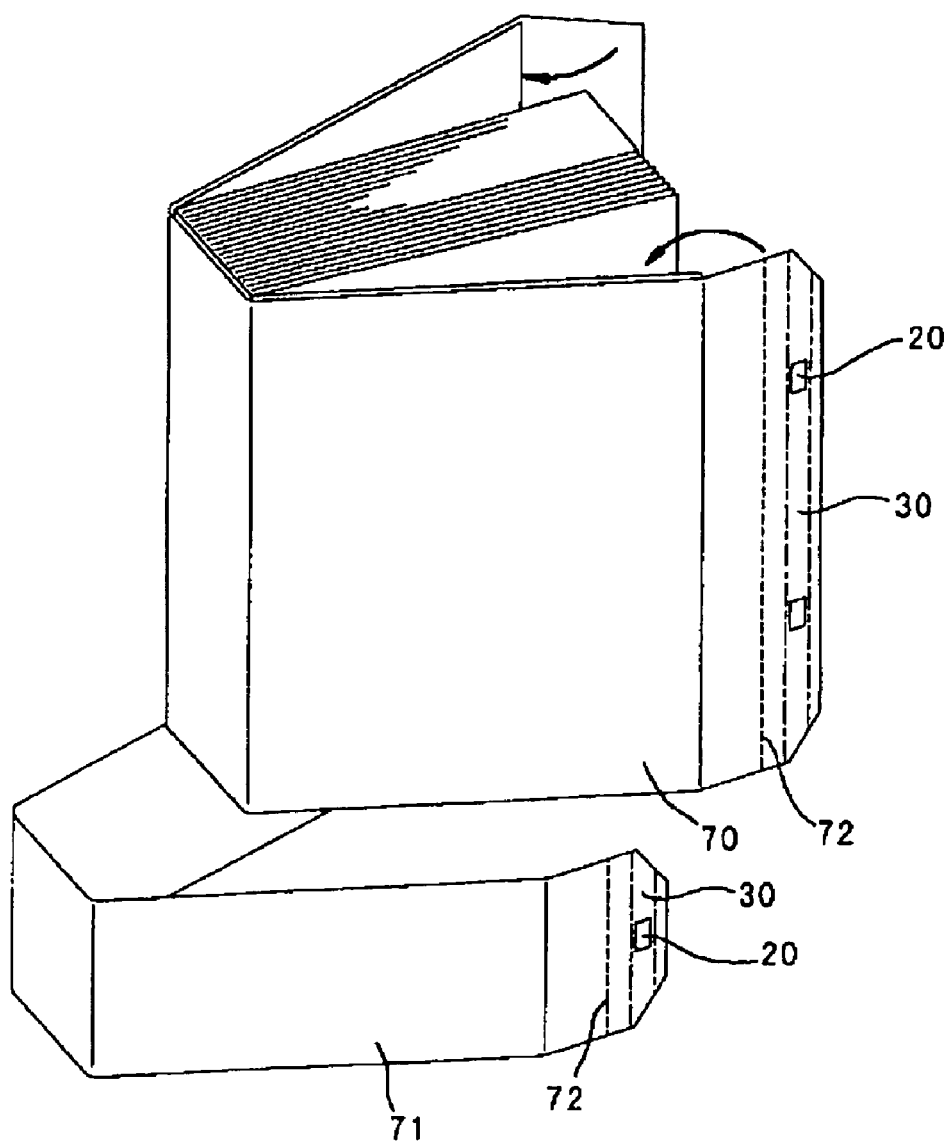
FIG. 4 is a perspective view of the sheet material according to another embodiment of the present invention.

FIG. 4 shows a paper book cover (70) and a paper band (71) wrapped around a book as one embodiment of the sheet material with an IC-tag tape (30). The book cover (70) and the paper band (71) are made of a paper material. In these examples, the IC-tag tape is embedded in the paper material. For example, the IC-tag tape may be positioned between the layers of the paper material. A piece of the book cover (70) or the paper band (71) can be torn off along the perforated line (72) and IC tag tape (30) is removed from the book cover (70) and the paper band (71). The IC-tag tape can be torn off along the perforated line (72).

Figure 5:
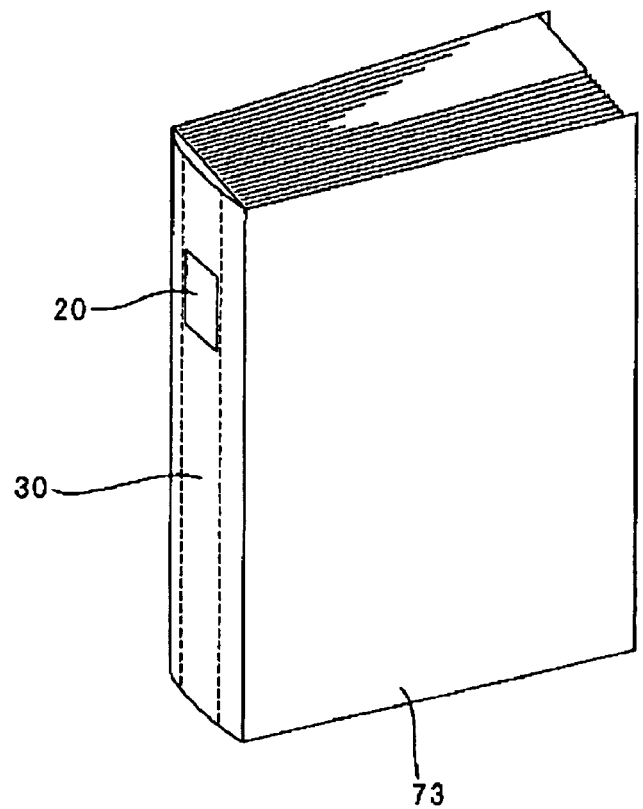
FIG. 5 is a perspective view of the sheet material according to another embodiment of the present invention.
Figure 6:
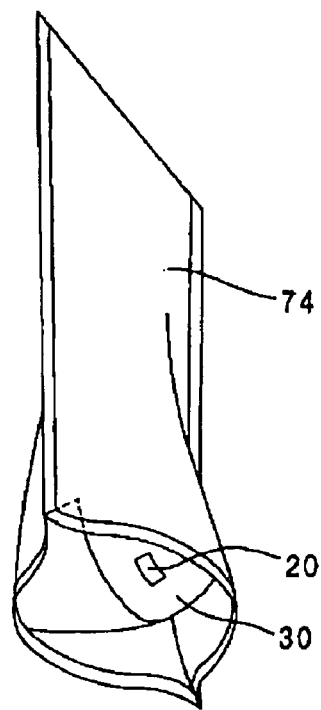
FIG. 6 is a perspective view of the sheet material according to another embodiment of the present invention.

In an alternative embodiment as shown in FIG. 5, the IC-tag tape can be placed on the spine of a hardcover book (73). Alternatively, the IC-tag tape (30) may form the bottom part of a packed bag (74), as shown in FIG. 6.

Figure 7:
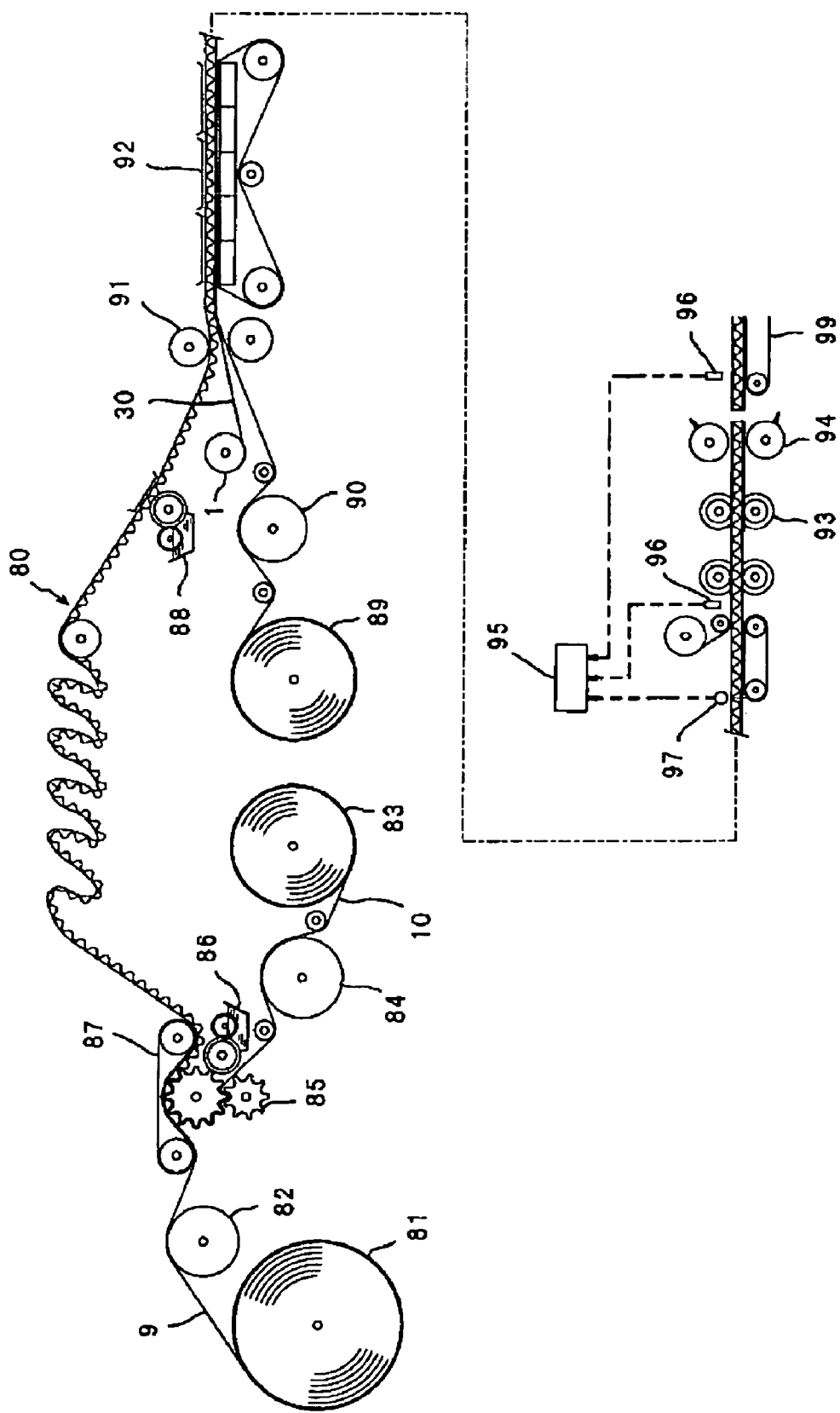
FIG. 7 is a schematic view of the production line for producing the sheet material using the production method according to one embodiment of the present invention.
Figure 8:
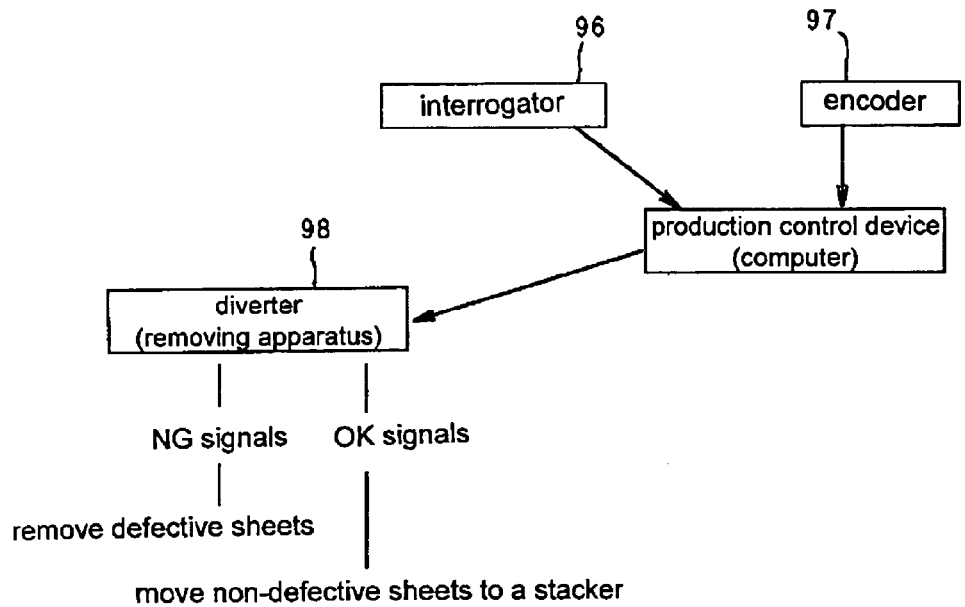
FIG. 8 is a block diagram of the inspection part of the production line according to the present invention.
Figure 9:
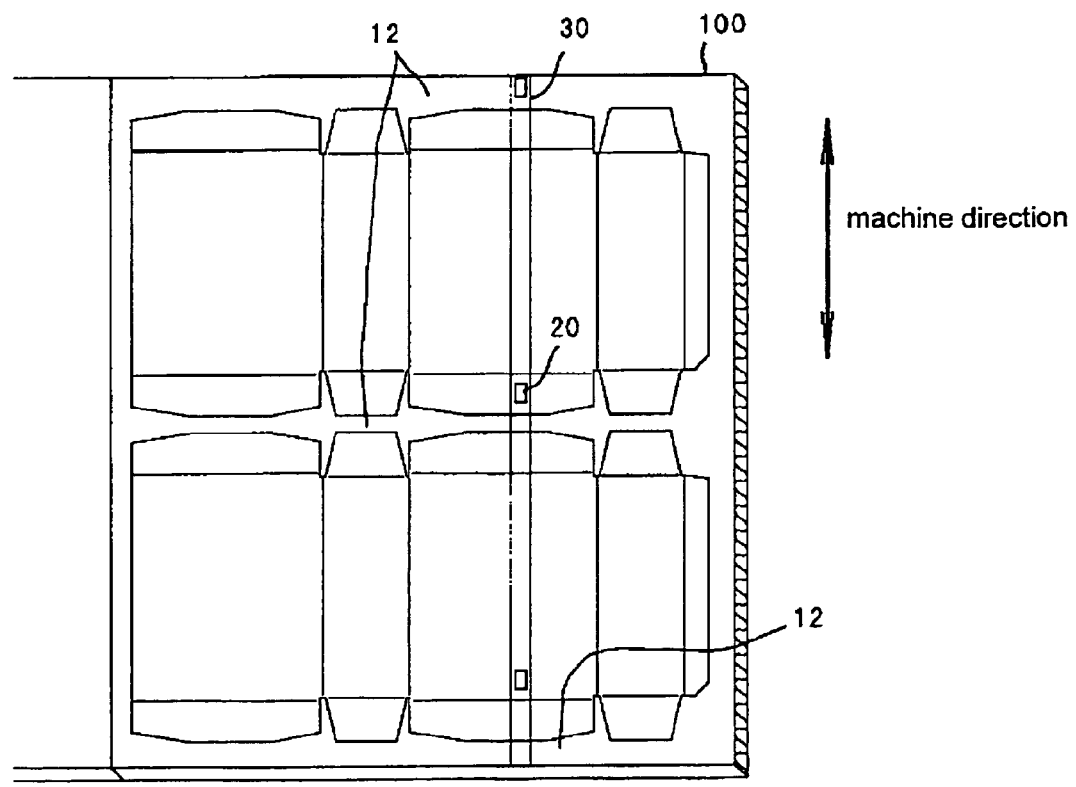
FIG. 9 is a view showing the layout of positions where the die cutter cuts the sheets into blanks and trims.

FIGS. 7 to 9 show a production line for the corrugated board as shown in FIG. 3 according to one embodiment of the production method of the present invention.

In the production line (80), the first linerboard (9) is provided from a first linerboard roll (81) to a heater roll (82) with which the first linerboard (9) is heated. The material to be formed into the corrugated medium is provided from a corrugated medium roll (83) via a vaporing or heater roll (84), a glue applicator (85) to a corrugating apparatus (86) where the material is corrugated into a corrugated medium. The first linerboard and the corrugated medium is attached together with a press belt (87). Then the first linerboard (9) and the corrugated medium (10) are adhesively attached to each other and are formed into a single-face flute (50). After that, the tips of flutes formed in the corrugated medium (10) of the single-face flute (50) are glued using the glue applicator (88). The glued single-face flute (50) then passes a bonding roll unit (91) that consists of an upper roll and a lower roll. The bonding roll unit (91) laminates the single-face flutes (50) and the second linerboard (8) that is provided from the second linerboard roll (89) via the heater roll (90). During this lamination, the IC-tag tape (30) is provided between the single-face flute (50) and the second linerboard (8) from an IC-tag tape reel. In this way, the first linerboard (8), the corrugated medium (10), the first linerboard (9), and the IC-tag tape (30) are adhesively attached to be formed into corrugated board (40). The corrugated board (40) is slit into a certain width by a slitter before it is cut with a cutter (94) into cut sheets (100) in which an IC-tag tape is embedded. The cutter (94) is controlled by the production control device (95) during the cutting process.

When the production control device (95) activates the IC tags (20), a interrogator (reader/writer) (96) with an antenna detects the location of the IC tags (20) in the corrugated board (40) and sends location signals indicating the locations of the IC tags (20) to the production control device (95) (an interrogator as used herein refers to a reader/writer). The encoder (97) measures the feed length of the corrugated board in the machine direction that passes below the encoder (97) and sends signals indicating the length of the corrugated board to the production control device (95). The production control device (95) uses these signals to calculate the MD position of the IC tags (20) in the corrugated board (40). Based on the calculated result, the production control device (95) sorts the cut sheet (100) with an IC tag (20) as a non-defective sheet or as a defective sheet. The non-defective sheet is defined as a cut sheet (100) including an IC tag (20) within the area to be formed into a resultant corrugated board box while the defective sheet is defined as a cut sheet (100) including no IC tag within the area. The production control device (95) further sends out signals to a diverter for automatically removing the defective cut sheets from the production line.

The method for producing corrugated board using the production line (corrugator) (80) is described below. When the single-face flute (50) and the second linerboard (8) are adhesively attached to each other, the IC-tag tape (30) is coupled between the corrugated medium (10) and the second linerboard (8). Preferably, the IC tags (20) on the IC-tag tape (30) face the second linerboard. Therefore the IC tags (20) do not make contact with the starch paste that is automatically applied by the glue applicator to the tips of the flutes formed in the corrugated medium (10). The IC-tag tape (30) as embedded in the corrugated board then passes over heating platens of the corrugator. The heating platens contact the outer side of the second linerboard on which no IC tags (20) exists. The IC tags (20) are positioned on the inner side of the second linerboard. Therefore, the temperature of the IC tags (20) are kept under around 90° C. Accordingly, the performance of the IC tags (20) is not worsened.

The single-face flute and the second linerboard are attached to each other using typical adhesives such as starch paste or vinyl acetate emulsion. Whether the typical adhesives can attach to the tape substrate (2) depends on the material of which the tape substrate (2) is made. If the tape substrate (2) is made of a material that is suitable for the attachment using the typical adhesives, the tape substrate (2) is attached to the corrugated medium (10). On the other hand if the tape substrate made of a material that is not suitable for the attachment using the typical adhesives, the tape substrate (2) is not attached to the corrugated medium (10). However, such adhesive does not exist on the interface between the IC-tag tape (30) and the second linerboard (8) in both cases. Therefore, the corrugated board (40) in both cases includes a dry streak, which may worsen the quality of the corrugated board. A statistic study on the quality management, however, has revealed that less than 5 mm of dry streak does not significantly reduce the compressive strength of the resultant corrugated board box. Therefore, even in the case that the tape substrate (2) is of plastic material, which does not stick to the above-mentioned adhesive, the resultant corrugated board box can have a sufficient compressive strength.

Typical equipment for inserting the IC-tag tape (30) between the single-face flute (10) and the second linerboard (8) includes a caster. The caster is placed in the aisle that is positioned on one side of the corrugator for allowing operators to operate the corrugator therefrom. A reel stand is placed on the caster. The reel stand includes an elongated bar extending across the corrugator. The elongated bar holds several reels of the IC-tag tape above the corrugator. The number of the reels is determined depending on how many number of pieces the corrugated board is slit into. The IC-tag tape is fed downwardly into the heating platens (92). The IC-tag tape (30) is then guided by a guide to the predetermined CD position in the corrugated board.

If the IC tags (20) are positioned between the cover tape (6) made of laminate film and the tape substrate (2), IC tag tape (30) with sandwiched IC tags (20) is formed (FIG. 2). When the IC-tag tape (30) with the sandwiched IC-tag (20) is embedded in the corrugated board (40), both the tape cover and the liner board work for avoiding the damage on the surface of the IC tags (20).

If certain adhesive is applied to the IC-tag tape (30) with the sandwiched IC-tags (20), the IC-tag tape (30) can be used as a cut tape with IC tags for corrugated board boxes (e.g. wraparound cases that are usually used for packaging beer cans). The cut tape is embedded around the wraparound case. By pulling the cut tape around the case, the wraparound case is opened and displayed.

The cover tape (6) may be surface-treated to eliminate blocking in winding/unwinding process. The IC-tag tape (30) with the surface-treated cover tape (6) is easy to be wound onto a tape reel.

When the IC-tag tape (30) with adhesive includes an organic transistor as an IC, it is possible to print an electronic circuit including an antenna directly on a tape substrate (2). The printed electronic circuit may be covered with a protecting coat. When the electronic circuit is covered with a protecting coat, cover tape (6) does not have to be used. If the tape substrate is strong enough for corrugator on-machine processing, an IC-tag tape having single layer structure as that of a cut tape can be formed by applying adhesive to one side of the tape substrate (2).

A reel (1) of IC-tag tape (30) with adhesive is placed upstream of the cutter (94) of the corrugator. The IC-tag tape (30) is attached to a corrugated board. When the production line (80) ramps up, the corrugated board gains some acceleration. The production line (80) preferably includes a driving apparatus (not shown) to allow the feeding speed of the IC-tag tape (30) to follow the high speed of the corrugated board. By using the driving apparatus, excessive load exerted on the IC-tag tape can be avoided.

The pitch of the IC tags (20) (IC-tag-pitch) on the IC-tag tape (30) is explained below. The IC-tag-pitch is determined according to the size of the resultant corrugated board box. Basically, the sheet material needs to contain one IC tag in an area to be formed into one box. Thus, the IC-tag-pitch is generally determined by the length of the cut sheet (cut sheets are formed by cutting the sheet material into a desired length in the machine direction by the cutter). Various cut length is defined by the cutter (94) according to the desired types of boxes of customers. As more than one thousand different sizes of corrugated boxes are produced in one factory, the lengths of the cut sheets can be vastly various. Specifically, the sheet material is cut into more than 500 different lengths by the cutter (94). It is practically impossible to stock IC-tag tapes so that their IC-tag-pitches correspond to all the box sizes required by all of the customers. Therefore it is more practical to use IC-tag tapes (30) having a pitch of IC tags (20) that roughly corresponds to the desired length of the cut sheet (100). The IC-tag tape (30) with roughly adjusted IC-tag-pitch can be used for different types of products ordered by different customers. This allows for reducing the frequency of replacing a reel of IC-tag tape (30) with another reel to produce a different size of boxes.

The IC-tag-pitch is determined according to the length of a corrugated board blank in the machine direction. The length of a blank in machine direction may be different depending on the type of corrugating rolls used in the factory or to the types of products ordered by customers. From G-flute corrugated boards, which have a flute depth of 1 mm, and from B-flute corrugated boards, which have a flute depth of 3 mm, comparatively small boxes (e.g. boxes for sweets) are produced. From A-flute corrugated boards and from double wall corrugated boards, comparatively large boxes (e.g. boxes for flowers and personal computers) are produced. Boxes for business equipments and for furniture are also produced from double wall corrugated boards. Among middle sized boxes, an A-1 type box for packaging oranges or a television set has flaps on its upper surface. The A-1 type box (regular slotted box) is made from a corrugated board having a cut length of 1.2 m to 1.8 m in machine direction.

On the other hand, a wraparound case is made from a cut sheet (100) having a comparatively short length (30-60 cm). When the length of the cut sheet (100) made into one case is short, the cutter (94) cuts the sheet material into twice or three times larger length than the length that is needed for one case. For larger boxes (A-1 type boxes), the sheet material made into one box has a length of 280 cm in the machine direction at most. Therefore, to attach one IC tag (20) to an area of corrugated board made into one box, the IC-tag-pitch should be 30 to 280 cm.

For corrugated boards made from non-paper material, the IC-tag-pitch can be determined in a similar manner. In example of plastic corrugated board, the IC-tag tape is attached to the plastic corrugated board by putting the IC-tag tape into the corrugated board in a hot-melt state.

The above described method for attaching an IC-tag tape (30) to sheet material can be applied to a packaging material other than those including layers laminated with air space between them like a corrugated board material. The IC-tag tape (30) can be applied, for example, to a laminated paper board to be formed into cartons (e.g. milk cartons). The laminated paper board is formed by laminating a sheet of paper and a sheet of plastic film or by laminating several sets of the laminated sheets.

Typical paper has a similar laminated structure to that of the laminated paper board. The lamination of the typical paper is formed by preparing pulp suspension (natural fibers suspended with water and other additives), flowing and dewatering the pulp suspension on a mesh net of a paper machine to form a wet web, combining several wet webs into a sheet, and then drying the sheet. During these steps, the IC-tag tape (30) is provided from a reel to a position between the wet webs running in the paper machine. The IC-tag-pitch of the IC-tag tape (30) is selected to be slightly shorter than the length of the final length of the resultant paper product so that at least one IC tag (20) is attached to the dried paper product. The tape substrate (2) in this embodiment is preferably made of thin paper that has a similar quality to the pulp to improve the bonding between the tape substrate (2) and the pulp. The IC-tag-pitch is determined according to the final length of the cut sheet that is specific to the resultant paper product (e.g. bond paper). The minimum IC-tag-pitch is about 5 cm.

The IC tags (20) on the IC-tag tape (30) can be located in any MD position (position in the machine direction) in the corrugated board (40). In other words, IC-tag tape (30) is provided onto the corrugated board (40) without predetermining the MD position of the IC tag (20) with regard to the cutting edge of corrugated board (40). At least one IC tag (20) can be placed in any MD position within an area to be formed into one corrugated board box. The area is also defined by the cross direction length in addition to the machine direction length. In practice, the CD position (position in the cross direction) of the IC-tag tape (30) on the corrugated board (40) is determined so that the IC-tag tape (30) will not be positioned in the trimmed part. When the IC-tag tape (30) having an IC-tag-pitch that is identical to the length of the cut sheet is not available, IC tag tape (30) having a similar IC-tag-pitch may be used. If the IC-tag-pitch is longer than the MD length of cut sheet (excluding the length of the trim), which is specific to the resultant product, cut sheet with no IC tag (20) is produced with a certain frequency. If the IC-tag-pitch is shorter than the MD length of the cut sheet, cut sheet with two or more IC tags (20) is produced with a certain frequency.

Accepted difference between the IC-tag-pitch and the length of the cut sheet is determined by the loss accepted by the maker or according to the production schedule (the accepted difference is determined for both cases when the IC-tag-pitch is shorter than the length of the cut sheet and when the IC-tag-pitch is longer than the length of the cut sheet). The more the difference between the IC-tag-pitch and the length of the cut sheet (100) is, more frequently cut sheets (100) with no IC tag (20) are produced. The cut sheets (100) with no IC tag (20) are thrown away as defective sheets. Accordingly, when more cut sheets with no IC tag (20) are produced, the production loss becomes higher. A limit for the production loss is set by the maker. To reduce the defective sheets, it is necessary for the manufacturers to prepare IC-tag tape (30) of several tens of IC-tag-pitches based on orders from customers for various box products. The manufacturers choose one type of IC-tag tape (30) among the prepared IC tag tapes (30) so that expected number of defective sheets will be below the predetermined loss limit.

It is important to reduce loss of corrugated board (40) and of IC tags (20) in producing corrugated board boxes with an IC-tag tape (30) as well as to reduce the stock items in managing the stock of the IC-tag tapes (30). For example, if the cut length based on the customer's orders varies in a certain narrow range, it is useful to prepare one type of IC-tag tapes (30) so that maximum gap between the cut length and IC-tag-pitch will be 5 cm. If the cut sheet is 125 cm long and the IC-tag-pitch is 120 cm, which is shorter than the length of the cut sheet, then one cut sheet out of 25 cut sheets is configured to have two IC tags (20). In this case, 4% of the cut sheets (100) and of IC-tag tape (30) are wasted. On the other hand, if the cut sheet is 125 cm long and the IC-tag-pitch is 130 cm, which is longer than the length of the cut sheet, then one cut sheet out of 26 cut sheets is configured to have no IC tag (20). In the latter case, less percentage of the cut sheets (100) and of the IC-tag tape (30) is wasted.

However, by making an IC-tag-operation software to select one of the two IC tags (20) that are attached to one cut sheet (100), the cut sheet (100) with two IC tags (20) does not have to be sorted as a defective sheet. In this example, if cut sheets (100) with two IC tags (20) are accepted by a customer, the IC tag pitch of the IC-tag tape (30) is preferably set to be shorter than the length of the cut sheet (100) so that cut sheets (100) with no IC tag (20) are not produced. Consequently the loss of the cut sheets (100) is reduced. Further, if an IC-tag tape (30) having an appropriate IC-tag-pitch is selectively used, and if the IC tag (20) is placed in a position that is not to be trimmed, the IC tag is not damaged during the die-cutting process. In other words, no defective cut sheets (100) with incorrectly positioned IC tags (20), no cut sheets (100) with two IC tags (20), or no cut sheets (100) with no IC tag (20) are produced. Therefore it is possible to reduce the need for removing such defective cut sheets after the die-cutting process.

In some cases, cut sheets (100) with two IC tags must be sorted as defective sheets according to the desired types of boxes ordered by customers. If IC-tag-pitch of the IC-tag tape (30) is longer than the length of the cut sheet (100) for the desired type of the boxes, no cut sheets (100) with two IC tags (20) are produced but cut sheets (100) with no IC tag (20) are produced. Cut sheets (100) with no IC tag (20) must be rejected from the production line. On the other hand, if the IC-tag-pitch of the IC-tag tape (30) is shorter than the length of cut sheets (100), cut sheets (100) with two IC tags (20) are produced while cut sheets (100) with no IC tag (20) are not produced. The cut sheets (100) with two IC tags (20) must be rejected from the production line.

Thus, it is necessary to construct a system for removing the defective cut sheets (100) with no IC tag from the successively produced cut sheets (100).

The inspection method for a corrugated board (40) with an IC-tag tape (30) is explained below. The easiest method is to use an interrogator (96) with a radio antenna that is positioned downstream of the cutter (94). After being cut by the cutter (94), the cut sheets (100) pass a sensor. For each cut sheet (100), the sensor starts generating the signals when the leading edge of the cut sheet (100) passes it and stops generating the signals when the tailing edge of the cut sheet passes it. If the a (96) detects a signal from one IC tag (20) while the sensor is generating the signals, the interrogator (96) sends out a signal for moving the cut sheet (100) to an auto stacker as a non-defective cut sheet (100). If the interrogator (96) detects no signals from IC tag (20) or detects signals from two IC tags (20) while the sensor is generating the signals, the cut sheet (100) is rejected from the production line as a defective cut sheet before the cut sheets are delivered to the auto stacker.

In some examples, cut sheets (100) with two IC tags (20) are acceptable for customers. In these examples, if the interrogator (96) detects signals from one or two IC tags (20) that are attached to a cut sheet (100) while the sensor is generating signals indicating that one cut sheet (100) is passing the sensor, the cut sheet is sorted as non-defective and moved to the auto stacker that is used in the next process. By changing the rejecting criteria, inspection conditions may be adjusted so that a cut sheet (100) with two IC tags (20) is sorted as non-defective while a cut sheet (100) with three IC tags (20) is sorted as defective.

FIG. 8 shows another inspection method using signals from an encoder (97). Typically, the production control device (95) stores previously calculated relative position between the encoder (97), the interrogator (96), and the cutter (94). The length of the cut sheets (100) is calculated using the signals from the encoder (97) by the production control device (95). When the corrugated board (40) passes the interrogator (96), the interrogator (96) sends the IC tag (20) on the corrugated board (40) a signal for activating the IC tag (20). The IC tag (20) receives the signal from the interrogator (96) and sends back a signal to the interrogator (96). The interrogator (96) receives and passes the signal to the production control device (95). The production control device (95) uses this signal for identifying the MD position of the IC tag (20). Before the corrugated board (40) reaches the cutter (94), which is positioned downstream of the interrogator (96), the production control device (95) sends the cutter (94) a signal for ordering the cutter (94) to cut the corrugated board (40) into a predetermined length. Then the interrogator (96) detects the position of the IC tag (20) on the cut sheet (100) and sends the production control device (95) a signal indicating whether the IC tag (20) is exists on the cut sheet (100). The signal from the interrogator (96) is received by the production control device (95). If the signal indicates that the IC tag (20) is positioned within the area to be formed into a box, the production control device (95) sends an OK signal to a diverter as programmed. If the signal indicates that the IC tag (20) is positioned in the area to be trimmed, the production control device (95) sends a NG signal to the diverter as programmed.

In this method, it is possible to detect defective cut sheets where the IC tag (20) is positioned in the area to be trimmed during the die cutting process or a process to form the cut sheet into a box (To form the cut sheet, the die cutting process and a gluing process are executed). FIG. 9 shows a blank layout of a cut sheet (100) for wraparound cases. The die-cutter cuts the cut sheet (100) along the lines shown in FIG. 9. FIG. 9 also shows the positions of trim pieces (12). In the example shown, two blanks are positioned in a cut sheet (100) along the machine direction. Accordingly, three trim pieces (12) are positioned in a cut sheet (100) along the machine direction. The production control device (95) calculates whether the IC tag (20) is positioned within the trim piece (12) using the trim data shown in FIG. 9 to determine whether the IC tag (20) is damaged by a die cutter during the process for forming the cut sheet (100) into a box. If the production control device (95) determines that an IC tag (20) is positioned in an effective area (i.e. area to be formed into a resultant corrugated board box) of a cut sheet (100) and that the IC tag (20) is not damaged or cut, then the cut sheet (100) is sorted as non-defective and sent to the auto stacker used in the next process. Such inspection and management system using the production control device (95) enables ensuring that an appropriate number of an IC tag or tags (20) are attached to a cut sheet (100).

Each IC tag (20) occupies a small area on the cut sheet (100). If the cutting line intersects the small area, the IC tag (20) is damaged. Consequently, a defective area (i.e. the area to be defined as trim area (12) by the die cutter) is set a little larger than the trim considering the size of the IC tag (20). The defective area may also be set a little larger considering the detection accuracy of the encoder (96). The IC tag (20) has a rectangular form that is defined by a first edge and a second edge that is shorter than the first edge. If the IC tag (20) is usually positioned on the tape substrate (2) so that its first edge extends along the longitudinal direction of the tape substrate (2) and to the machine direction in order to use a tape substrate (2) with a smaller width, the defective area should be set as a comparatively large area. On the other hand, if the IC tag (20) is positioned on the tape substrate (2) so that its second edge extends along the longitudinal direction of the tape substrate (2) and to the machine direction, the defective area can be set as a comparatively small area.

Such calculation to figure out the defective area and for the production control device (95) to determine whether the cut sheet is defective or non-defective is carried out by sampling the signals from the interrogator (96) and from the encoder (97) for calculating the length of the cut sheet that has passed. The calculation may be performed after the cutting off process (i.e. process for cutting the sheet material into cut sheets having a predetermined length in the machine direction). However, it is comparatively difficult to avoid vibrating the cut sheets on a conveyer and to sample the accurate signals from the encoder (97).

The production control device (95) sends a diverter (98) NG signals indicating the IC tag on a cut sheet is defective. The diverter (98) is configured to move upwardly and downwardly. The diverter (98) moves one end of the conveyer (99) downwardly and guides defective cut sheets below the conveyer (99) to reject the defective cut sheets from the production line. In this way, the defective cut sheets are accumulated in a stocker that is placed under the auto stacker. Existent system can be used for the process of rejecting defective sheets. Such existent system is used for rejecting excessively short cut sheets (100) that are produced while the slitting dimension is changed to another dimension or for rejecting cut sheets (100) with a piece of silver paper or with a label that indicates the defective spot on the paper material of which corrugated board (40) is made.

These inspection methods enable not only detecting whether one or two IC tags (20) are positioned on a cut sheet of the corrugated board but also checking whether the IC tags (20) have a sufficient performance using the interrogator with a radio antenna. The performance of the IC tags (20) can be worsened by an external impact exerted while the IC tags (20) are attached to a cut sheet. This method serves for maintaining the quality of the products.

The above-described method for rejecting defective cut sheets (100) of the corrugated board material with a defective IC tag (20) can be an effective inspection method and an effective quality assurance method for paper packages made of laminated paper. Such paper package is produced by unwinding the reeled laminated paper and then printing or die cutting the laminated paper.

Flat pieces of some plied sheet material with IC tags (e.g. a lamination of solid and flat paper board with flat plastic sheets or a lamination of plastic sheets) can be provided as raw material in a production line to check IC tag quality. In the example of cut sheets of such material, a defective cut sheet having a defective IC tag (20) is rejected from the production line during a folding and gluing process (i.e. a process for folding and applying glue on the cut sheet (100)), which is a final process after the die-cutting of the cut sheet (100). In this example, a series of cut sheets that are running at a high speed are inspected. When a CCD camera detects one of the cut sheets is passing in front of it, the CCD camera sends a signal indicating that the cut sheet is passing. In the area that is detected by a CCD camera, the interrogator (96) detects the IC tag (20) by reading the signal from the IC tag (20) while the interrogator (96) sends to the production control device (95) a signal indicating that it received a signal from the IC tag (20). The production control device (95) then sends a signal to a rejecting device to make the rejecting device reject defective sheets or sends a signal to spraying device to make the spraying device spray ultraviolet fluorescent liquid to the defective cartons or cut sheets. When the interrogator with a radio antenna detects, for example, that no IC tag (20) is activating correctly on the inspected cut sheet (100) (e.g. the case the IC tag (20) on the cut sheet (100) is damaged or the case no IC tag (20) is attached to the cut sheet (100)) is including the case no IC tag (20) is attached to the cut sheet (100)), or that two IC tags (20) are attached on the cut sheet, the interrogator sends out a signal to the production control device (95). The production control device (95) then sends a signal to the rejecting device or to the spraying device. When these devices receive the commands, they reject the defective cartons or cut sheets or quickly spray ultraviolet fluorescent liquid to spraying the liquid.

What is claimed is:

1. A successive sheet material having a plurality of IC-tag tape (30) along its entire length, the successive sheet material formed by the steps of:

preparing a tape reel (1) of an IC-tag tape to which IC tags (20) are attached with such an IC-tag-pitch that each cut sheet includes at least one IC tag;

unwinding said IC-tag tape from said tape reel that is held by a reel stand and driving apparatus;

providing said IC-tag tape in a machine direction to attach said IC-tag tape into said successive sheet material continuously unwinding IC-tag tape substrate at a substantially equivalent speed to the running speed of said successive sheet material and attaching said IC-tag tape to said successive sheet material in an unpredetermined machine direction position with regard to a cutting edge of said successive sheet material in attaching the IC-tag tape located in any machine direction to said successive sheet material; and calculating by a production control device whether IC-tags are positioned in an area of the cut sheet to be trimmed in the next die-cutting process, using a set of trim data of the box blank to be formed into boxes, and using a set of encoder signals at the stream of a cutter indicating a length of said successive sheet material and detecting means signals indicating location of the IC-tags on the IC-tag tape attached to said successive sheet material;

wherein said successive sheet material is formed in a plurality of layers, wherein an interface between said IC-tag tape substrate and layer material forms less than 5 mm dry streak, wherein said dry streak has a width of said tape IC-tag substrate that does not reduce the compressive strength of the cut sheets and boxes.

2. A successive wet paper material having several IC-tag tapes in serially parallel along its entire length, the successive wet paper material formed by the steps of:

forming several wet webs by flowing and dewatering the pulp suspension on a mesh net of a paper machine;

preparing tape reel (1) of an IC-tag tape to which IC tags (20) are attached with such an IC-tag-pitch that each cut sheet includes at least one IC tag;

unwinding said IC-tag tape from said tape reel that is held by a reel stand and driving apparatus;

providing said IC-tag tape in a machine direction to a position between the wet webs running in the paper machine at a substantially equivalent speed of the wet paper material attaching said IC-tag tape to said successive wet paper material in an unpredetermined machine direction position; and Combining said several wet webs into wet paper to make the resultant paper product attached to said IC-tag tapes successively, wherein said IC-tags are adhered on a tape substrate with adhesive material.

3. A successive sheet material having a plurality of IC-tag tapes in serially parallel along its entire length, the successive sheet material formed by the steps of:
preparing a tape reel (1) of an IC-tag tape to which IC tags (20) are attached with such an IC-tag-pitch that each cut sheet includes at least one IC tag;
unwinding said IC-tag tape from said tape reel that is held by a reel stand and driving apparatus;
providing said IC-tag tape in a machine direction at a substantially equivalent speed to the running speed to the successive sheet material to attach said IC-tag tape to said successive sheet material continuously unwinding IC-tag tape and attaching said IC-tag tape to said successive sheet material in an unpredetermined machine direction position with regard to a cutting edge of said sheet material in attaching IC-tag tape located in any machine direction to said successive sheet material; and
calculating by a production control device stored previously calculated relative position among an encoder, an interrogator and a cutter whether IC-tags are positioned in an area of the cut sheet to be trimmed in a next die-cutting process, using a set of trim data of the box blanks to be formed into boxes, and using a set of encoder signals at the upstream of the cutter indicating the length of said successive sheet material and detecting means signals indicating location of the IC-tags on the tape attached to said successive sheet material;
wherein said successive sheet material is a plastic corrugated board being formed of a plurality of layers,
wherein said IC tag tape is put on a hot-melted part of said plastic corrugated board.

4. A cut sheet (100) from a successive sheet material cut by pulling IC-tag tapes being attached to said successive sheet material in serially parallel along its entire length, the cut sheet formed by the steps of:
preparing tape reels (1) of an IC-tag tape to which IC tags (20) are attached with such an IC-tag-pitch that each cut sheet includes at least one IC tag;
unwinding said IC-tag tape from said tape reel that is held by a reel stand and driving apparatus;
providing said IC-tag tape in a machine direction at a substantially equivalent speed to the running speed to the successive sheet material to attach said IC-tag tape to said successive sheet material continuously unwinding IC-tag tape and attaching said IC-tag tape to said successive sheet material in an unpredetermined machine direction with regard to a cutting edge of said successive sheet material in attaching the IC-tag tape located in any machine direction position to said successive sheet material;
calculating by a production control device storing previously calculated relative position among an encoder, an interrogator and a cutter whether IC-tags are positioned in an area of the cut sheet to be trimmed in a next die-cutting process, using a set of trim data of the box blanks to be formed into boxes, and using a set of encoder signals at the upstream of the cutter indicating the length of said successive sheet material and detecting means signals indicating location of the IC-tags on the tape attached to said successive sheet material;
cutting said successive sheet material into said cut sheets with a predetermined length in the machine direction; and
rejecting defective sheets that IC-tag position is determined to be positioned in a trimmed area and defective sheets with no IC-tag signal by an interrogator detection at the upstream of an auto stacker before die cutting process by a diverter.

5. A wraparound case made of a cut sheet of claim 4,
wherein said wraparound case is opened and display,
wherein said IC-tag tape works as a cut tape consisting of a film that is 30 to 60 micrometers in thickness, and
wherein said IC-tag tape is 2 to 10 mm in width.

6. A successive sheet material having several IC-tag tapes (30) in serially parallel along its entire length, said successive sheet material formed by the steps of:
preparing a tape reel (1) of an IC-tag tape to which IC-tags (20) are attached with such an IC-tag-pitch that each cut sheet includes at least one IC tag;
unwinding said IC-tag tape from said tape reel that is held by a reel stand and driving apparatus; and
providing said IC-tag tape in a machine direction at a substantially equivalent speed to the running speed to the successive sheet material to attach said IC-tag tape to said successive sheet material continuously unwinding IC-tag tape and attaching said IC-tag tape to said successive sheet material in an unpredetermined machine direction with regard to a cutting edge of said successive sheet material in attaching said IC-tag tape located in any machine direction position to said successive sheet material; and
calculating by a production control device stored previously calculated relative position among the encoder, the interrogator and the cutter whether IC-tags are positioned in an area of the cut sheet to be trimmed in a next die-cutting process, using a set of trim data of the box blanks to be formed into boxes, and using set of encoder signals at the upstream of the cutter indicating the length of said successive sheet material and detecting means signals indicating location of the IC-tags on the tape attached to said successive sheet material;
wherein said IC-tag tapes are attached with an IC-tag pitch according to cut length of cut sheets to be formed in manufactured cases,
wherein said successive sheet material can be cut by pulling IC-tag tapes that can be strong as common cut tapes,
wherein said IC-tag tapes are configured and embedded around the surface of cases to be used to open and display.

7. The successive sheet material of claim 6,
herein IC-tags are attached on the tape substrate with adhesive material and not adhered on the successive sheet material.

8. A successive sheet material that can be cut by pulling IC-tag tapes attached to said successive sheet material in parallel along its entire length,
preparing a tape reel (1) of an IC-tag tape to which IC-tags (20) are attached with such an IC-tag-pitch that each cut sheet includes at least one IC tag;
unwinding said IC-tag tape from said tape reel that is held by a reel stand and driving apparatus;
providing said IC-tag tape in a machine direction at a substantially equivalent speed to the running speed to the successive sheet material to attach said IC-tag tape to said successive sheet material continuously unwinding IC-tag tape and attaching said IC-tag tape to said successive sheet material in an unpredetermined machine direction position with regard to a cutting edge of said successive sheet material in attaching said IC-tag tape located in any machine direction position to said successive sheet material; and calculating by a production control device storing previously calculated relative position among the encoder, the interrogator, and the cutter whether IC-tags are positioned in an area of the cut sheet to be trimmed in a next die-cutting process, using a set of trim data of the box blanks to be formed into boxes, and using set of encoder signals at the upstream of the cutter indicating the length of said successive sheet material and detecting means signals indicating location of the IC-tags on the tape attached to said successive sheet material;

wherein IC-tag attached on the tape substrate with adhesive material and not adhered on the successive sheet material;

wherein said IC-tag tapes are attached with an IC-tag pitch according to cut length of cut sheets by a cutter;

wherein said tape substrate is strong to use as cut tapes;

wherein said successive sheet material is inspected in the production line by a production control device before the successive sheet material is cut into cut sheets.

9. A die-cut sheet cut by pulling IC-tag tape attached to said die-cut sheet from a successive sheet material of claim 8, wherein said IC-tag tapes are 2 to 10 mm in width;

wherein said IC-tag tapes are successively attached to said successive sheet material during the printing process or the stretching process;

wherein said IC-tag tape is cut into pieces on a folding carton including multi-pack, made of single layered sheet material;

wherein said folding carton is inspected by the interrogator device in the production line that detects whether IC-tag is damaged by the die-cutter during the die-cutting process;

wherein said folding carton blank is die-cut after printing continuously; and wherein said the folding carton blank damaged by the die-cutter is rejected under the detection by an interrogator in the production line with no detection signal.

10. A paper book cover wrapping around a book and having IC-tag tapes along a length of said paper book cover, said paper book cover is formed by the step of:

preparing tape reels of the IC-tag tape according to cut length of said paper book cover, wherein said IC-tag tape is positioned between the layers of the paper material or positioned on the surface of the paper material;

unwinding said IC-tag tape from said tape reel that is held by a reel stand, providing said IC-tag tape in a machine direction at a substantially equivalent speed to the running speed to the successive sheet material to attach a IC-tag tape to said successive sheet material without rewinding the tape substrate and without predetermining the machine direction position of IC-tag with regard to a cutting edge of said successive sheet material in attaching said IC-tag tape located in any machine direction to said successive sheet material;

calculating by a production control device stored previously calculated relative position among the encoder, the interrogator and the cutter whether IC-tags are positioned in an area of the cut sheet to be trimmed in a next die-cutting process, using a set of trim data of the box blank to be formed in boxes, and using set of encoder signals at the upstream of the cutter indicating the length of said successive sheet material and detecting means signals indicating location of the IC-tags on the tape attached to said successive sheet material;

cutting said successive sheet material into said paper book cover with a predetermined length in the machine direction; and rejecting defective sheets that IC-tag position is damaged and defective sheets with no IC-tag signal by an interrogator detection at the upstream of an auto stacker;

wherein said paper book cover is die-cut from successive sheet material having IC-tag tapes in parallel;

wherein said IC-tag tape can be torn off the book cover;

wherein said paper book cover has said IC-tag tape attached with such an IC-tag pitch that each paper book cover includes at least one IC-tag.

\* \* \* \* \*